(12) United States Patent
Larky et al.

(10) Patent No.: US 7,489,092 B1
(45) Date of Patent: Feb. 10, 2009

(54) METHOD AND APPARATUS FOR ENHANCED ALERT NOTIFICATION

(75) Inventors: Steven P. Larky, Del Mar, CA (US); Darrin Vallis, Austin, TX (US)

(73) Assignee: Cypress Semiconductor Corporation, San Jose, CA (US)

(*) Notice: Subject to any disclaimer, the term of this patent is extended or adjusted under 35 U.S.C. 154(b) by 215 days.

(21) Appl. No.: 11/540,524

(22) Filed: Sep. 28, 2006

Related U.S. Application Data

(60) Provisional application No. 60/722,626, filed on Sep. 29, 2005.

(51) Int. Cl.
*H02P 5/00* (2006.01)

(52) U.S. Cl. .................. 318/34; 318/66; 318/69

(58) Field of Classification Search ............ 318/34, 318/55, 59, 66, 69, 76
See application file for complete search history.

(56) References Cited

U.S. PATENT DOCUMENTS 5,179,523 A * 1/1993 Johnson ............... 702/24
6,257,832 B1 * 7/2001 Lyszkowski et al. ......... 417/2

* cited by examiner

*Primary Examiner*—Rina I Duda

(57) ABSTRACT

A system, fan controller and method for enhanced alert notification. Embodiments provide an effective mechanism for utilizing system fans to create alert tones or messages, where fan speed differentials may be adjusted to alter the frequency of the fan interference sounds. As such, existing hardware can be used to reduce cost by producing audible alerts which may be heard above ambient noise in a room with one or more electronic systems. Further, the frequency of the interference sounds may be altered to more clearly identify one or more systems to which a fault pertains.

20 Claims, 8 Drawing Sheets

METHOD AND APPARATUS FOR ENHANCED ALERT NOTIFICATION

RELATED APPLICATIONS

The present application is related to and claims the benefit of U.S. Provisional Application No. 60/722,626, filed Sep. 29, 2005, entitled "FAN CONTROLLER WITH ALERT CAPABILITY," naming Steven P. Larky and Darrin Vallis as the inventors, assigned to the assignee of the present invention. That application is incorporated herein by reference in its entirety and for all purposes.

BACKGROUND OF THE INVENTION

Many electronic systems require cooling to dissipate heat generated by electronic components. Since radiation and conduction are less-effective heat transfer methods in an enclosed system, convective cooling solutions are often used. As such, a common electronic system may have one or more fans to drive air over components, exhaust warm air from the system and draw cooler air into the system.

Regardless of the implementation, a spinning cooling fan will emit some noise. Noise often results from the fan motor bearing, air moving past the fan blades and body of the fan, and the placement of the fan with respect to other objects (e.g., a vent in an electronic system chassis). Additionally, a more pronounced noise may result from multiple fans spinning at different speeds, where the noise profiles from the fans intersect to produce a "beating" sound. Given that the beating sound is often much louder and more annoying than the sound from an individual fan, conventional fan controllers attempt to spin proximately-located fans at precisely the same speed to reduce the beating sound.

Although the reduction of fan interference sounds is often important in a single electronic system with multiple fans, it becomes even more of an issue when multiple systems are placed in proximity to one another (e.g., in a computer server room). Since each system is likely to have at least one fan, the placement of multiple systems in the same room can dramatically increase the number of fans which may interfere with one another and create beating sounds. And moreover, given that the ambient air temperature of rooms containing multiple systems is often higher than rooms containing a single system, systems designed to be placed in the presence of other systems often contain more fans or larger fans that produce more noise. As such, the beating sounds are often louder, more prevalent and more annoying than those associated with a single system.

Despite attempts by conventional fan controllers to spin fans at the same speed, some fan speed differential and associated beating sound is likely to remain, especially in environments with multiple systems. Additionally, even if all fan speed differentials were eliminated, the ambient noise from the many fans is often very loud even without any beating. As such, it is often hard to identify audible faults. And even if a fault is identified, it is often hard to discern which system a given fault is associated with. Similarly, given the large number of solid and blinking lights on multiple systems placed near one another, visual faults (e.g., a blinking light) are also hard to identify and distinguish. Thus, given that most electronic systems are equipped with such audible and visual fault indicators, the price of the systems is increased while still providing poor fault indication.

SUMMARY OF THE INVENTION

Accordingly, a need exists for improved alert notification in a computer system environment. A need also exists for alert notification with reduced system cost. Additionally, a need exists for alert notification which more clearly identifies which system or systems to which a fault pertains. Embodiments of the present invention provide novel solutions to these needs and others as described below.

Embodiments of the present invention provide a system, fan controller and method for enhanced alert notification. More specifically, embodiments provide an effective mechanism for utilizing system fans to create alert tones or messages, where fan speed differentials may be adjusted to alter the frequency of the fan interference sounds. As such, existing hardware can be used to reduce cost by producing audible alerts which may be heard above ambient noise in a room with one or more electronic systems. Further, the frequency of the interference sounds may be altered to more clearly identify one or more systems to which a fault pertains.

In one embodiment, a system includes a first fan and a fan controller coupled to the first fan and operable to control the first fan. The system also includes a first interface coupled to the fan controller for receipt of alert signals. The alert signals may be associated with one or more components of the system (e.g., ethernet hardware, power supply, etc.) and may indicate a condition warranting attention (e.g., battery low, power failure, component failure, overheated component, required system reboot, etc.). Alternatively, the alert signal may be that which is optionally routed to a light-producing device, speaker, etc. Additionally, the fan controller is further operable to vary a speed differential between the first fan and a second fan, wherein the speed differential is operable to create an audible sound, and wherein a variation in the speed differential is used to change a frequency of the audible sound in response to a received alert signal. As such, one or more fans may be used to create an audible alert from a received alert signal, where the frequency of the audible alert may be varied such that the alert comprises speech, music, a siren, or the like. Thus, not only may the alert be heard above ambient room noise, but the alert may more clearly identify one or more systems to which a fault pertains.

In another embodiment, a fan controller includes a first interface for receiving an input signal. A processor is coupled to the first interface, where the processor is for generating an alert signal in response to a received input signal. A fan speed control is coupled to the processor, where the fan speed control is for varying a speed differential between a first fan and a second fan in response to a received alert signal. The speed differential is operable to create an audible sound representing an alert, where a variation in the speed differential is used to change a frequency of the audible sound in response to the received alert signal. Additionally, the fan controller may include a memory coupled to the processor for storing alert information, where the processor is operable to determine a portion of the alert information associated with the received input signal, and where the portion of alert information is used to generate the alert signal. Further, the fan controller may also include a second interface coupled to the processor and for receiving temperature signals associated with a plurality of hardware components cooled by airflow from at least one of the first fan and the second fan, and wherein the fan controller is operable to change a speed of at least one of the first fan and the second fan in response to a received temperature signal.

And in yet another embodiment, a method for enhanced fault notification includes receiving an input signal. An alert signal is generated in response to receipt of the input signal, wherein the alert signal is operable to control a speed differential between a first fan and a second fan, and wherein the speed differential is operable to create an audible sound. The speed differential is varied to change a frequency of the audible sound. Additionally, a portion of alert information associated with the input signal may be determined, wherein the portion of alert information is used to generate the alert signal. Further, the method may include receiving a temperature signal associated with a plurality of hardware components, wherein the plurality of hardware components are cooled by airflow from at least one of the first fan and the second fan. A speed of at least one of the first fan and the second fan may be adjusted in response to the temperature signal.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Figure 1:
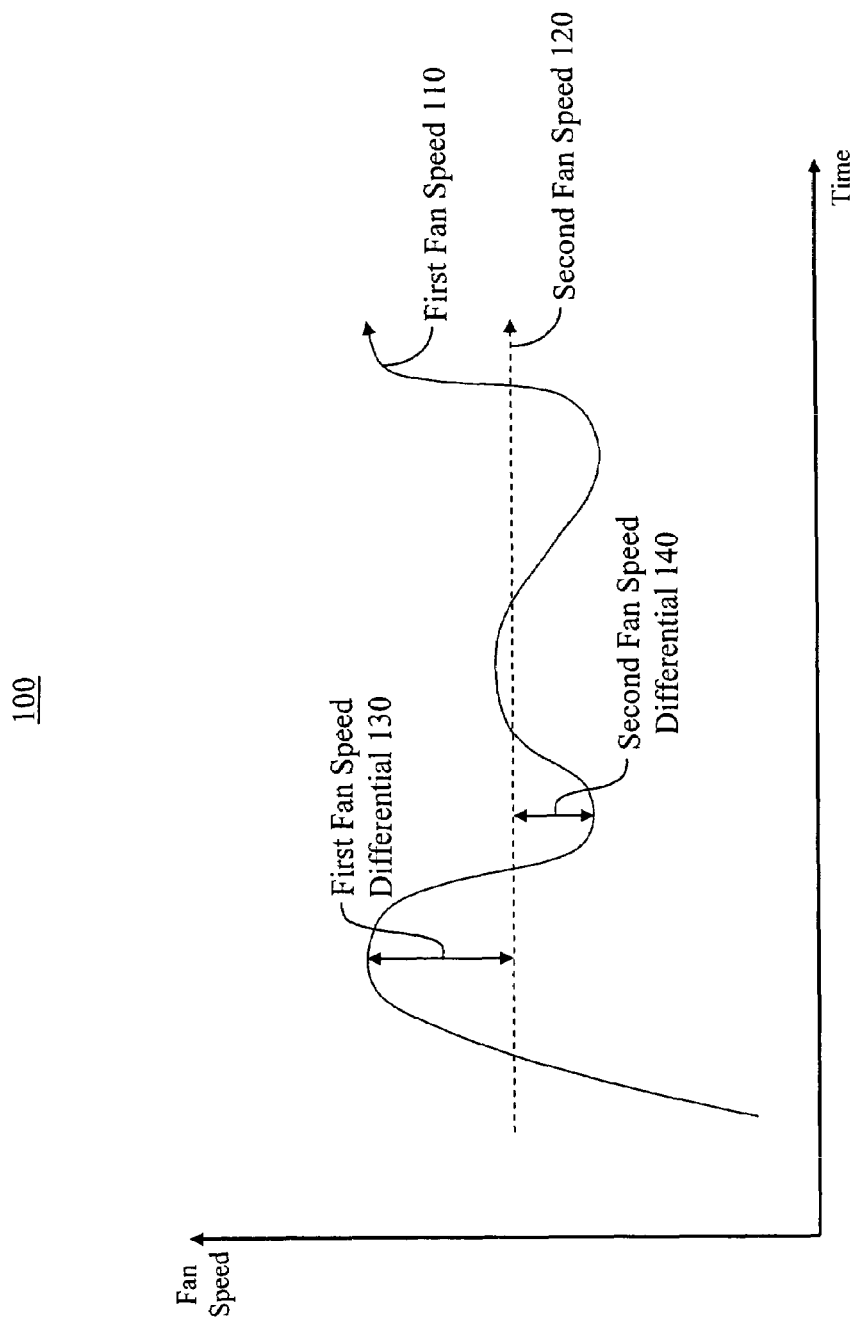
FIG. 1 shows an exemplary fan speed graph of a variable-speed fan and a constant-speed fan in accordance with one embodiment of the present invention.

FIG. 1 shows exemplary fan speed graph 100 of a variable-speed fan and a constant-speed fan in accordance with one embodiment of the present invention. As shown in FIG. 1, a first fan speed 110 and second fan speed 120 are graphed with respect to time. First fan speed 110 represents a variable-speed fan, whereas second fan speed 120 represents a fan spinning at a substantially-constant speed. As such, variation of first fan speed 110 with respect to second fan speed 120 creates fan speed differentials (e.g., first fan speed differential 130 and second fan speed differential 140), where the differential between the two fan speeds may vary with respect to time. For example, first fan speed differential 130 is larger than second fan speed differential 140.

If a first fan whose speed may be represented by first fan speed 110 is located close enough to a second fan whose speed may be represented by second fan speed 120, a fan interference sound (e.g., a "beating" sound) may occur. The fan interference sound can be caused by an intersection of the noise profiles of the two fans, where a "beat" may be produced by a summation of the amplitudes of the noise profiles. As such, the first and second fans may be located within the same system (e.g., a computer system, computer server, etc.), or located in different systems that are near enough to produce a fan interference sound. Alternatively, one fan may be located with a system, while the other fan may be located outside a system (e.g., as part of a HVAC system, a room fan, etc.).

The frequency of the fan interference sound may vary based upon the magnitude of the fan speed differential. As such, the speed of the first fan (e.g., represented by first fan speed 110) may be varied to change the magnitude of the fan speed differential, thereby altering the frequency of the resulting interference sound. In one embodiment, an increase in the magnitude of the fan speed differential may decrease the frequency of the fan interference sound, whereas a decrease in the magnitude of the fan speed differential may increase the frequency of the fan interference sound. For example, first fan speed differential 130 may produce a lower frequency interference sound than second fan speed differential 140 given that differential 130 is larger than differential 140.

Additionally, the intensity or sound level of the resulting interference sound may be varied by increasing or decreasing the speed of the fans. For example, an increase in the average speed of the fans (e.g., those represented by fan speeds 110 and 120) may contribute to an increase in intensity of the fan interference sound. For example, first fan speed differential 130 is depicted in FIG. 1 with a larger average fan speed than second fan speed differential 140, and therefore, the fan interference sound corresponding to fan speed differential 130 may be more intense than a fan interference sound corresponding to fan speed differential 140. Conversely, if the average speed of the fans decreases, then the intensity may reduce. As a further example, if the speed of both fans change with little change in the magnitude of the fan speed differential, then an increase in speed of the fans would create an increase in the average fan speed, thereby increasing the intensity of the interference sound. Conversely, if the speed of both fans reduces with little change in magnitude of the fan speed differential, then the intensity of the interference sound may decrease given a drop in average fan speed.

Although FIG. 1 depicts a specific relationship between the speeds of two fans (e.g., fan speed 120 is constant and fan speed 130 follows a depicted speed variation), it should be appreciated that the two fan speeds may be alternatively represented in other embodiments. For example, second fan speed 120 may vary in other embodiments, or alternatively, may comprise a combination of constant and varying periods. Similarly, first fan speed 110 may be alternatively varied, or in another embodiment, may comprise a combination of constant and varying periods.

Additionally, although FIG. 1 depicts a change in the magnitude of a fan speed differential for only two fans, it should be appreciated that more than two fans may produce fan interference sounds in other embodiments. As such, one or more fan interference sounds may co-exist based on one or more fan speed differentials. Thus, a resultant frequency and/or intensity of the fan interference sound may be based on a combination of multiple fan interference sounds.

Figure 2:
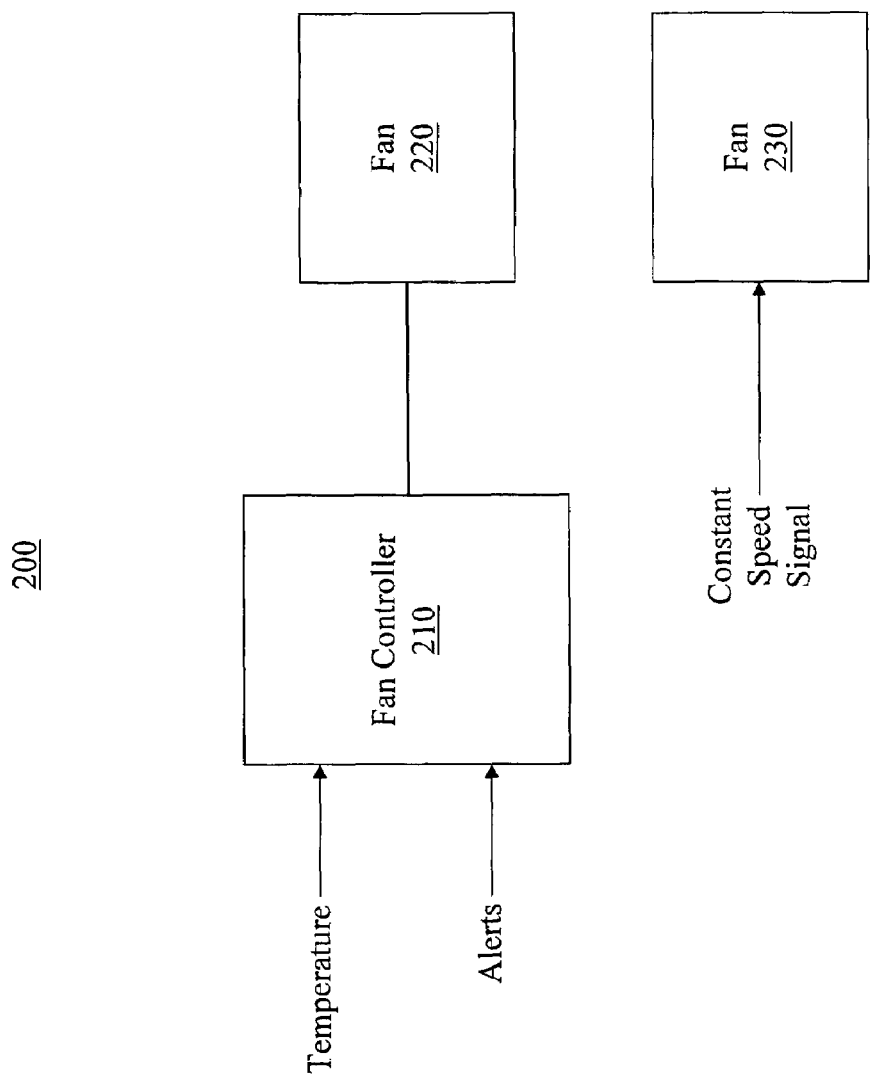
FIG. 2 shows a block diagram of an exemplary fan controller coupled to a fan in accordance with one embodiment of the present invention.

FIG. 2 shows block diagram 200 of an exemplary fan controller coupled to a fan in accordance with one embodiment of the present invention. As shown in FIG. 2, fan controller 210 is coupled to fan 220 for controlling its speed in response to temperature and/or alert inputs. The speed of fan 220 may be represented by first fan speed 110 of FIG. 1.

As shown in FIG. 2, temperature inputs may be fed to fan controller 210 for monitoring temperatures within a system (e.g., for which fan 220 provides heat dissipation). As such, fan controller 210 may then control the speed of fan 220 to respond to changes in the system temperature, where the temperature input may comprise one or more temperatures from various locations within the system. For example, if fan controller 210 detects a rise in system temperature at one or more locations, then the speed of fan 220 may be increased to reduce the system temperature to an acceptable level. The properties of the control system implemented by fan controller 210 may be preconfigured (e.g., by a user, during manufacture, etc.), where control system parameters may be stored in a memory coupled to or integrated within fan controller 210. Alternatively, the control system may be dynamically configured on-the-fly by a system coupled to or integrated within fan controller 210.

Alert signals may also be input to fan controller 210 (e.g., for monitoring faults associated with a system, etc.). The alert signals may be associated with one or more components of the system (e.g., ethernet hardware, power supply, etc.) and indicate a condition warranting attention (e.g., battery low, power failure, component failure, overheated component, required system reboot, etc.). Alternatively, the alert signal may be that which is optionally routed to a light-producing device, speaker, etc. of the system. As such, fan controller 210 may be integrated in place of or in conjunction with existing hardware.

Upon detecting a request for an alert, fan controller 210 may control the speed of fan 220 to produce an audible alert generated by a differential in speed of fan 220 with respect to fan 230 (e.g., as discussed above with respect to FIG. 1). Fan 230 may be driven at a substantially-constant speed (e.g., 120 of FIG. 1) in proximity to fan 220 such that the speed of fan 220 (e.g., 110 of FIG. 1) may be varied to change the magnitude of the fan speed differential, thereby changing the frequency and intensity of the fan interference sound (e.g., as discussed above with respect to FIG. 1). As such, the fan controller 210 may control the frequency and intensity of the fan interference sound to produce an alert comprising speech, music, a siren, or the like. Thus, an alert may be detected above ambient room noise and more clearly identify one or more systems to which a fault pertains, thereby providing enhanced fault notification and/or isolation using existing system hardware to reduce cost.

Although FIG. 2 shows only one fan (e.g., 220) coupled to fan controller 210, it should be appreciated that more than two fans may be coupled to fan controller 210 for control thereof in other embodiments. Additionally, although fan 230 has been described as being spun at a substantially-constant speed to simplify the discussion, it should be appreciated that speed of fan 230 may be varied in other embodiments.

Figure 3:
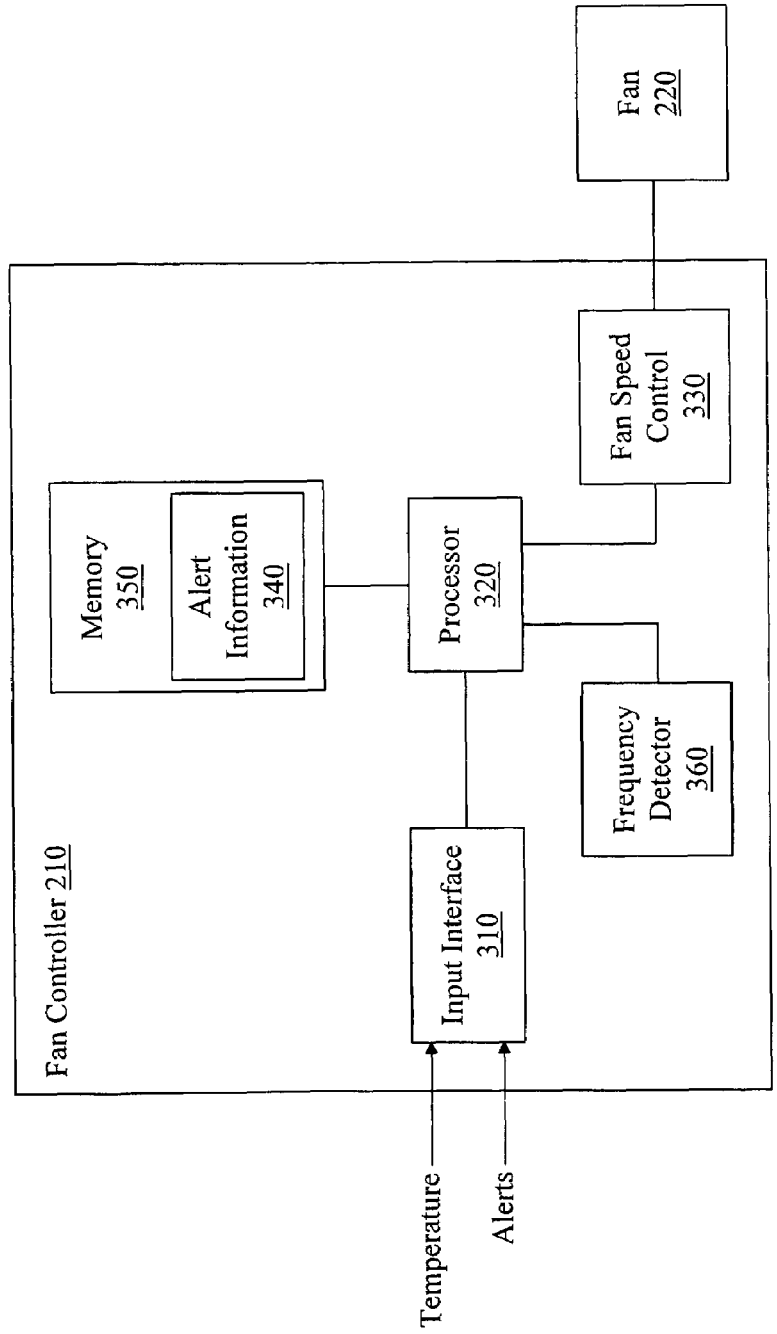
FIG. 3 shows a block diagram of an exemplary fan controller in accordance with one embodiment of the present invention.

FIG. 3 shows block diagram 300 of an exemplary fan controller in accordance with one embodiment of the present invention. As shown in FIG. 3, fan controller 210 is coupled to fan 220 for controlling its speed in response to temperature and/or alert input signals fed into input interface 310. Signals input via input interface 310 may be conveyed to processor 320 for processing. As such, fan controller may monitor temperatures and alerts as discussed above with respect to FIG. 2.

Upon accessing a temperature signal from input interface 310, processor 320 may determine a temperature associated with the system and also whether additional airflow is required based upon the determined temperature. If additional airflow is needed, processor 320 may send a signal to fan speed control 330 to increase the speed of fan 220. Fan speed control 330 may control fan 220 using a pulse width modulation (PWM) signal, analog signal, or the like, and may receive fan speed information (e.g., a digital or analog signal indicating revolutions per minute, a voltage proportional to its speed, etc.) from fan 220, a tachometer (not shown) coupled to processor 320, or the like. Alternatively, if it is determined that a received temperature has been reduced to an acceptable level, processor 320 may instruct fan speed control 330 to reduce the speed of fan 220. As such, fan speed controller 210 may be used to set a baseline fan speed such that system temperatures are maintained at a given level, where the control system properties may be either preconfigured or dynamically configured on-the-fly as discussed above with respect to FIG. 2. Additionally, control system parameters may be stored within memory 350 (e.g., for access by processor 320).

Upon accessing an alert input signal from input interface 310, processor 320 may determine the nature of the alert (e.g., to which portions of the system it pertains). Thereafter, processor 320 may access alert information 340 from coupled memory 350, where alert information may comprise information (e.g., data, instructions, etc.) relevant to the requested alert that processor 320 may use to implement an audible alert. For example, alert information 340 may comprise fan speed information required to implement a given siren, speech or other alert. Alternatively, alert information 340 may comprise frequency information that processor 320 may use to derive fan speed information for implementing the siren, speech or other alert. As such, once fan speed information is obtained from the relevant alert information (e.g., 340), processor 320 may instruct fan speed control 330 to adjust the speed accordingly (e.g., using fan speed feedback as discussed above) to implement the alert by varying the frequency and/or intensity of the fan interference sounds.

Processor 320 may perform frequency calibration using frequency detector 360, where frequency detector 360 is capable of measuring a frequency and/or intensity of sound. Frequency detector 360 may comprise a microphone, or alternatively, may comprise a microphone and one or more signal processing components required to measure the frequency and/or intensity of sound. Frequency calibration may be used to determine a fan speed (e.g., of fan 220) required to produce a given frequency when the speed of a second fan (e.g., 230) is unknown. Alternatively, frequency calibration may be used to fine-tune a system for which fan speeds are known or reasonably approximated. As such, processor 320 may vary the speed of fan 220 until a desired frequency is produced, where the frequency is determined by processor 320 based upon input from frequency detector 360. By more accurately determining a fan speed for which a given frequency is produced, processor 320 may more accurately implement a given alert for which fan speed or frequency information (e.g., alert information 340) is available (e.g., within memory 350).

As shown in FIG. 3, fan speed controller 210 may be implemented using a programmable system on a chip (PSOC) microcontroller. As such, input interface 310 may be implemented using one or more PSOC ports (e.g., digital input/output, analog input/output, etc.), which are coupled to a PSOC core implementing processor 320. Memory 350 may be implemented using one or more memories (e.g., SRAM, SROM, flash, etc.) coupled to the core. Frequency detector 360 and fan speed control 330 may be implemented as PSOC peripherals using one or more digital and/or analog blocks, where the peripherals may also utilize various PSOC system resources to perform frequency detection and fan speed control operations. Additionally, control system parameters for configuring fan controller 210 may be input via one or more system resources (e.g., I2C, etc.), where configuration may be performed manually (e.g., by a user) or dynamically (e.g., by another system, device, component, etc.) via a host coupled to the PSOC.

Although FIG. 3 shows only one fan coupled to fan controller 210, it should be appreciated that multiple fans may be coupled to fan controller 210 in other embodiments. Additionally, more than one fan may be coupled to fan speed control in other embodiments. Further, although FIG. 3 shows only one fan speed control (e.g., 330), it should be understood that fan controller 210 may comprise more than one fan speed control in other embodiments. As such, each fan speed control component may be coupled to one or more fans. Alternatively, one or more of the fan speed control components may be unused and not coupled to any fans.

Figure 4:
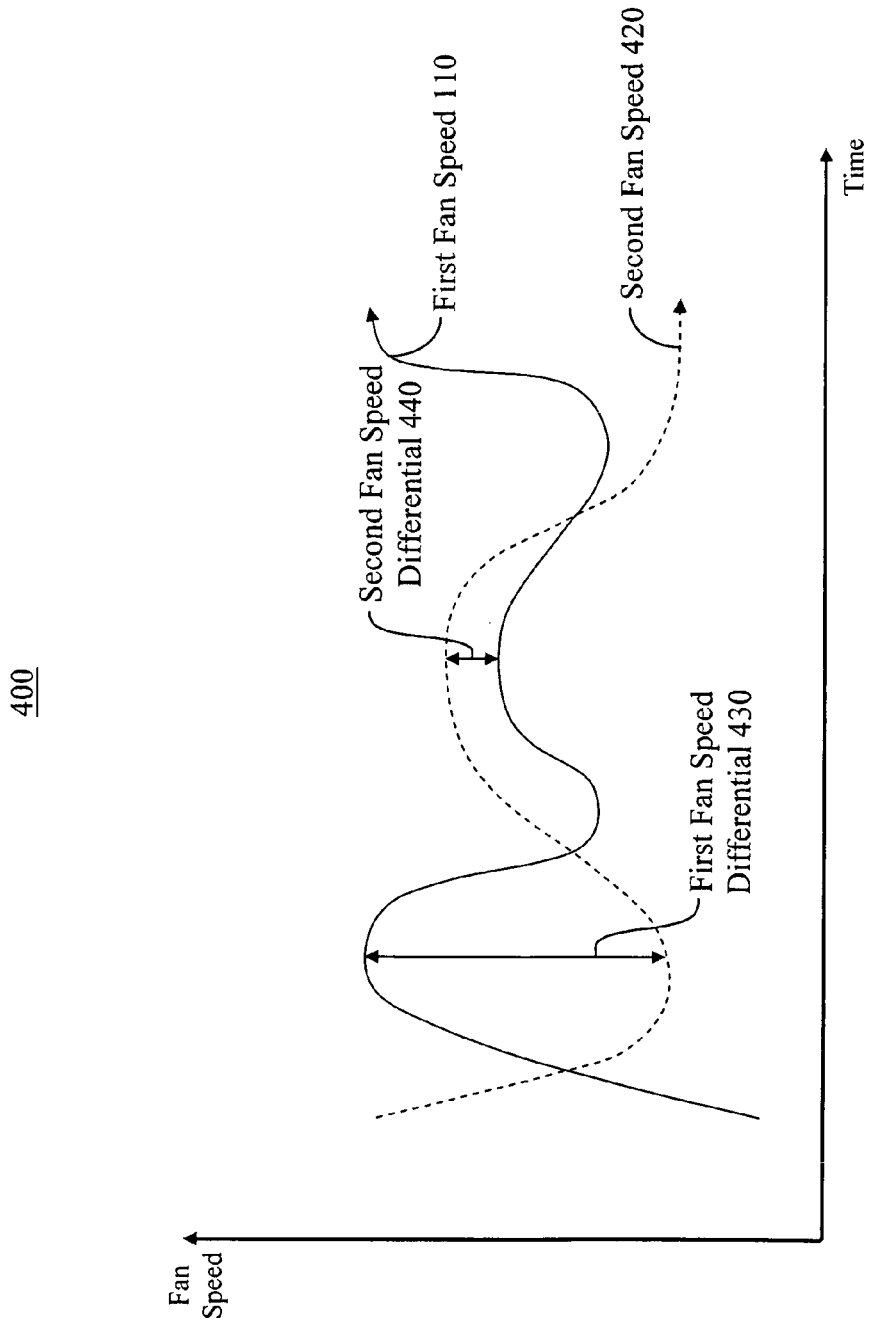
FIG. 4 shows an exemplary fan speed graph of two variable-speed fans in accordance with one embodiment of the present invention.

FIG. 4 shows exemplary fan speed graph 400 of two variable-speed fans in accordance with one embodiment of the present invention. As shown in FIG. 4, a first fan speed 110 and second fan speed 420 are graphed with respect to time, similar to the fan speeds graphed in graph 100 of FIG. 1. However, whereas second fan speed 120 of FIG. 1 represented a fan spinning at a substantially-constant speed, second fan speed 420 represents a variable-speed fan similar to first fan speed 110. As such, a variation of either fan speed with respect to the other creates fan speed differentials (e.g., first fan speed differential 430 and second fan speed differential 440), where the differential between the two fan speeds may vary with respect to time. For example, first fan speed differential 430 is larger than second fan speed differential 440.

As discussed above with respect to FIG. 1, the magnitude of the fan speed differential may change the frequency of the resulting fan interference sounds (e.g., to implement alert notifications, etc.). Also, a variation in the average fan speed may create a change in intensity of the fan noise as discussed above with respect to FIG. 1. However, given that both fan speeds (e.g., 110 and 420) are variable as depicted in graph 400, a change in the magnitude of the fan speed differential may be controlled by changing the speed of either fan. As such, a fan speed controller may vary the speed of either fan, simultaneously or individually, to change the frequency and/or intensity of the fan interference noise. Additionally, the fans whose speeds are represented in FIG. 4 may be located with the same system, within different systems located near enough to produce an audible fan interference sound. Alternatively, at least one fan may be located outside a system.

Although FIG. 4 depicts a specific relationship between the speeds of two fans, it should be appreciated that the two fan speeds may be alternatively represented in other embodiments. For example, first fan speed 110 and/or second fan speed 420 may be alternatively varied, or in another embodiment, may comprise a combination of constant and varying periods. Additionally, although FIG. 4 depicts a change in the magnitude of a fan speed differential for only two fans, it should be appreciated that more than two fans may produce fan interference sounds in other embodiments. As such, one or more fan interference sounds may co-exist based on one or more fan speed differentials. Thus, a resultant frequency and/or intensity of the fan interference sound may be based on a combination of multiple fan interference sounds.

Figure 5:
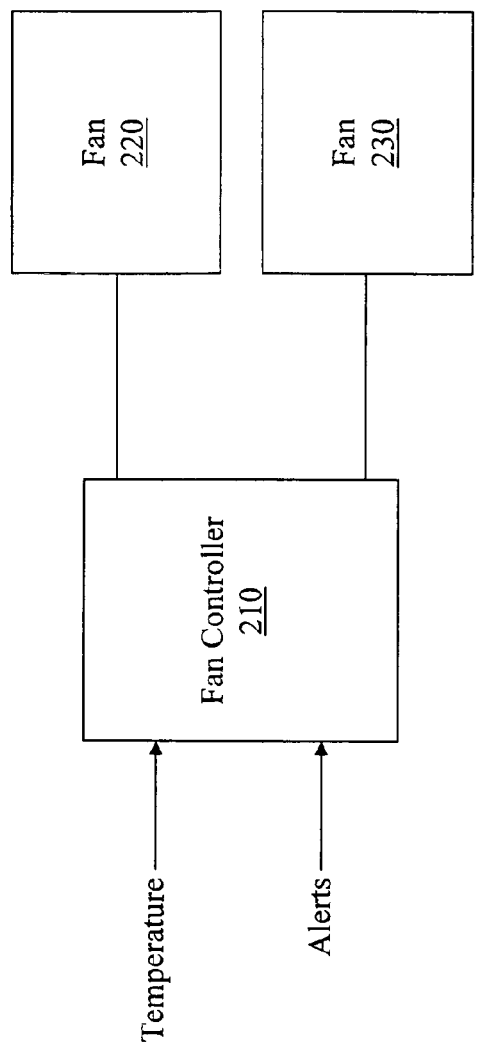
FIG. 5 shows a block diagram of an exemplary fan controller coupled to multiple fans in accordance with one embodiment of the present invention.

FIG. 5 shows block diagram 500 of an exemplary fan controller coupled to multiple fans in accordance with one embodiment of the present invention. As shown in FIG. 5, fan controller 210 is coupled to fan 220 and fan 230 for controlling the speed of the fans (e.g., first fan speed 110 and second fan speed 420) in response to temperature and/or alert inputs. As such, fan controller 210 may use two fans to regulate system temperature (e.g., by adjusting the baseline fan speed, etc.), and also vary the magnitude of the fan speed differential (e.g., 430, 440, etc.) to implement audible alerts or notifications as discussed above (e.g., with respect to FIGS. 1, 2, 3 and 4). Alternatively, where fan controller 210 is coupled to more than two fans in other embodiments, fan controller 210 may perform such operations by controlling more than two fans.

Figure 6:
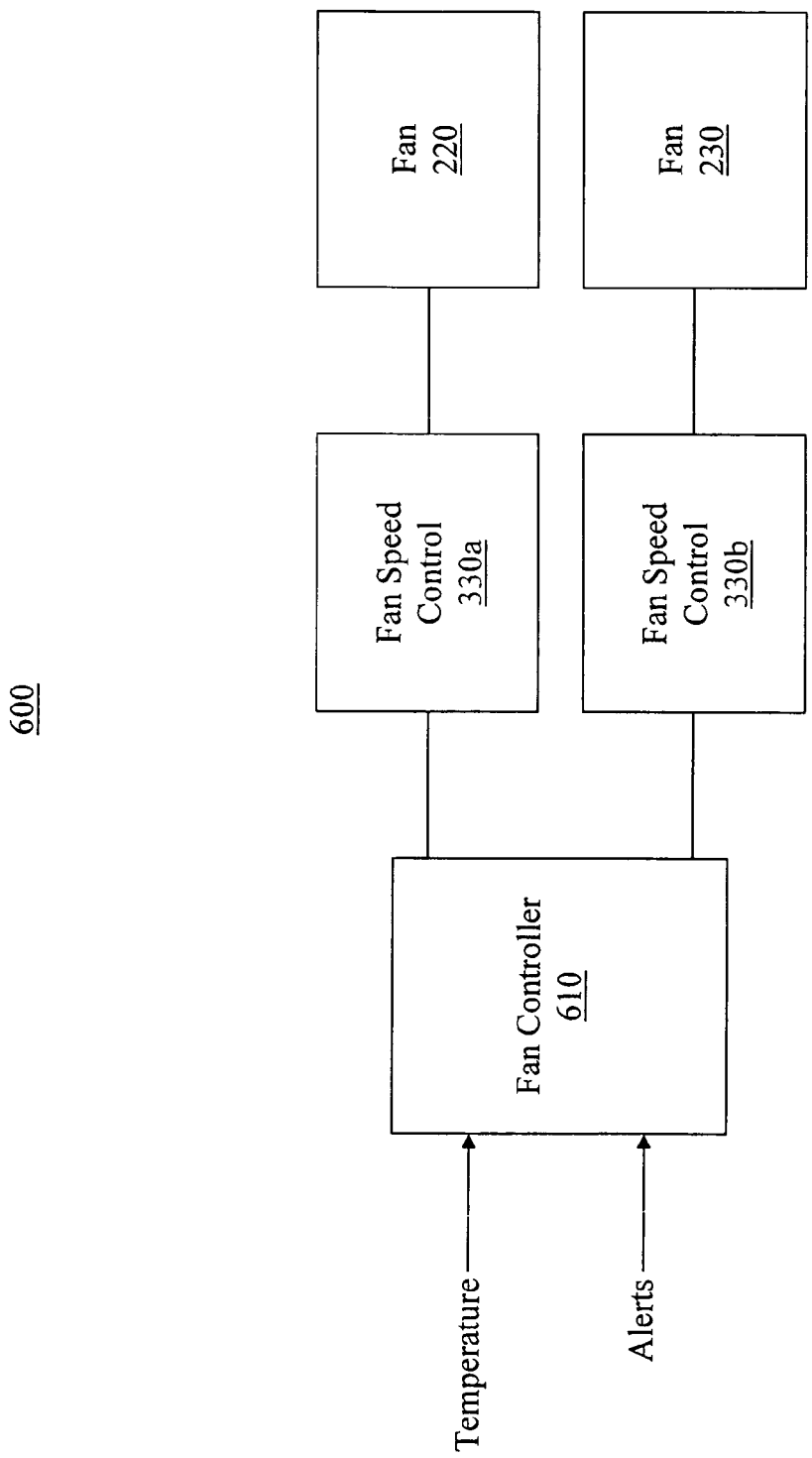
FIG. 6 shows a block diagram of an exemplary fan controller coupled to multiple fans with external fan speed controls in accordance with one embodiment of the present invention.

FIG. 6 shows block diagram 600 of an exemplary fan controller coupled to multiple fans with external fan speed controls in accordance with one embodiment of the present invention. As shown in FIG. 6, fan controller 610 is coupled to separate external fan speed controls 330a and 330b, where the combination of fan speed controller 610 and external speed controls 330a and 330b may operate analogously to fan controller 210 with internal fan speed controls (e.g., 330). As such, in response to receiving temperature and/or alert inputs, fan controller 610 may regulate system temperature (e.g., by adjusting the baseline fan speed, etc.), and also vary the magnitude of the fan speed differential (e.g., 430, 440, etc.) to implement audible alerts as discussed above (e.g., with respect to FIGS. 1, 2, 3, 4 and 5). For example, fan speed control 330a is operable to control the speed of coupled fan 220 in response to control signals sent from fan controller 610. Similarly, fan speed control 330b is operable to control the speed of coupled fan 230 in response to control signals sent from fan controller 610. Upon receiving control signals from fan controller 610, fan speed control 330a and/or 330b may vary the speed of a coupled fan (e.g., 220 and/or 230) by generating a PWM signal, analog signal, or the like (e.g., as discussed above with respect to FIG. 3).

Although fan controller 610 is shown coupled to two fans in FIG. 6, it should be appreciated that fan controller 610 may control more than two fans in other embodiments. Additionally, fan controller 610 may utilize all internal fan speed controls (e.g., 330), all external fan speed controls (e.g., 330a, 330b, etc.), or a combination of internal and external fan speed controls to control coupled fans.

Figure 7:
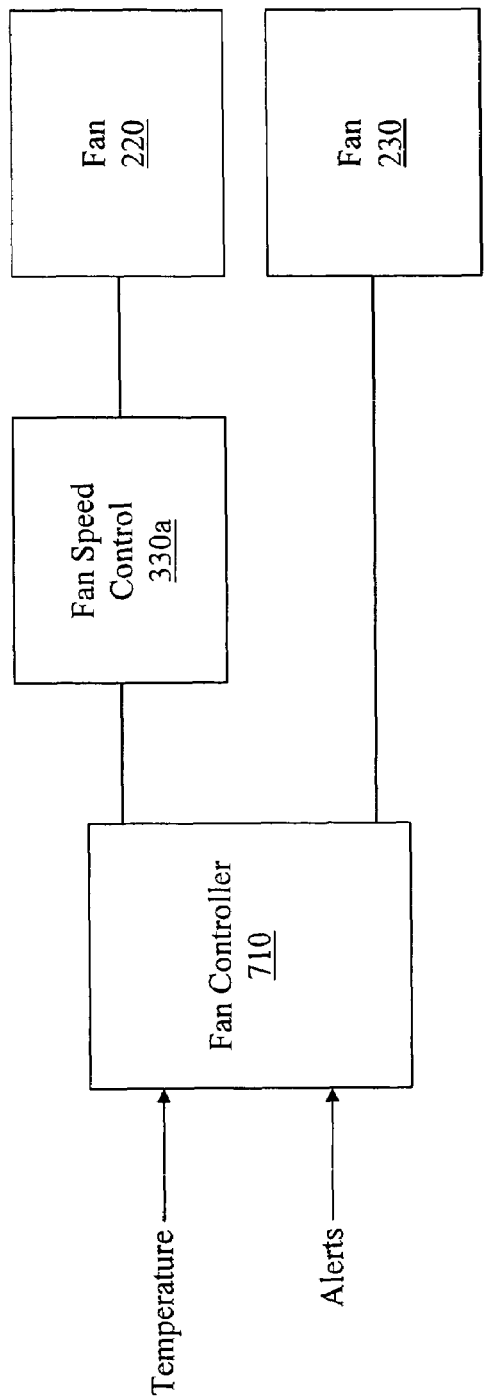
FIG. 7 shows a block diagram of an exemplary fan controller coupled to multiple fans with external and internal fan speed controls in accordance with one embodiment of the present invention.

FIG. 7 shows block diagram 700 of an exemplary fan controller coupled to multiple fans with external and internal fan speed controls in accordance with one embodiment of the present invention. As shown in FIG. 7, fan controller 710 may control coupled fans 220 and 230 analogously to fan controller 610, except that fan controller 710 uses a combination of internal and external fan speed controls to control coupled fans. As such, in response to receiving temperature and/or alert inputs, fan controller 710 may regulate system temperature (e.g., by adjusting the baseline fan speed, etc.), and also vary the magnitude of the fan speed differential (e.g., 430, 440, etc.) to implement audible alerts as discussed above (e.g., with respect to FIGS. 1, 2, 3, 4, 5 and 6). For example, fan speed control 330*a* is operable to control the speed of coupled fan 220 (e.g., using PWM signals, analog signals, etc.) in response to control signals sent from fan controller 710. However, fan 230 may be directly controlled by fan controller 710 (e.g., by use of internal fan speed control 330), where fan controller 710 may control the speed of fan 230 by varying a PWM signal, analog signal, or the like.

Although fan controller 710 is shown coupled to two fans in FIG. 7, it should be appreciated that fan controller 710 may control more than two fans in other embodiments. Additionally, fan controller 710 may utilize all internal fan speed controls (e.g., 330), all external fan speed controls (e.g., 330*a*, 330*b*, etc.), or a combination of internal and external fan speed controls to control coupled fans.

Figure 8:
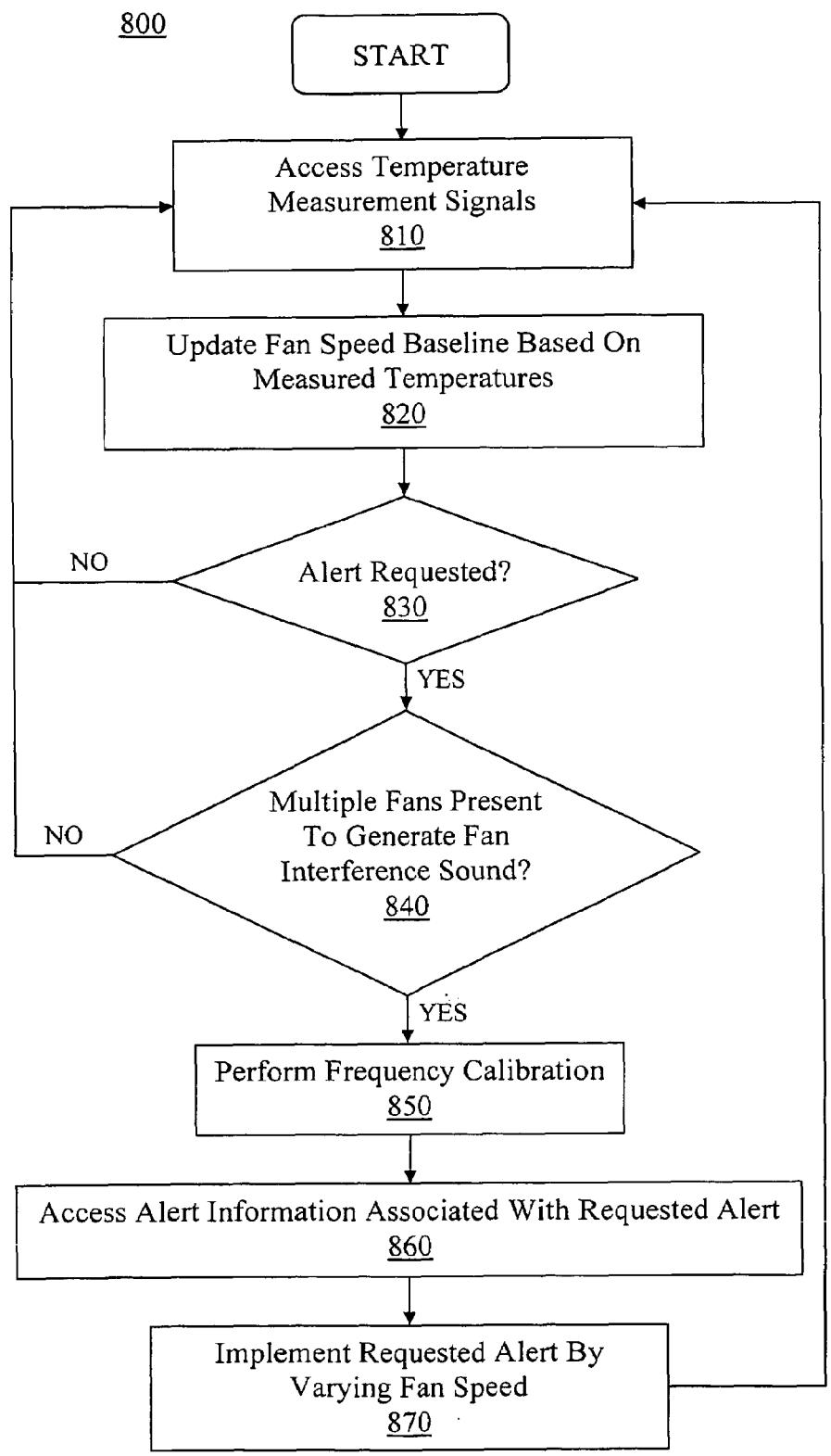
FIG. 8 shows a process for enhanced alert notification in accordance with one embodiment of the present invention.

FIG. 8 shows process 800 for enhanced alert notification in accordance with one embodiment of the present invention. As shown in FIG. 8, step 810 involves accessing temperature measurement signals. The temperature measurement signals may be accessed by a fan controller (e.g., 210, 610, 710, etc.), and may represent temperatures within one or more locations of a single system or multiple systems. Additionally, the temperature measurement signals may be associated with a system or systems for which fans controlled by the fan controller may provide heat dissipation.

After accessing the temperature measurement signals, a fan speed baseline may be updated in step 820 based upon the measured temperatures. The fan speed baseline may represent an average fan speed for one or more fans controlled by a fan controller (e.g., 210, 610, 710, etc.) to provide sufficient cooling for a system or systems (e.g., for which fans controlled by the fan controller provide heat dissipation). As such, an increase in a system temperature may indicate a need to raise the fan speed baseline to provide additional heat dissipation, thereby lowering the system temperature. Conversely, a decrease in a system temperature may indicate a need to lower the fan speed baseline to reduce heat dissipation, thereby raising the system temperature.

As shown in FIG. 8, a determination is made in step 830 as to whether an alert is requested. An alert request may be detected by monitoring an alert input signal, where an alert input may identify a fault present in one or more components (e.g., ethernet hardware, power supply, etc.) of one or more systems (e.g., for which the fan speed baseline is updated in step 820) and indicate a condition warranting attention (e.g., component failure, overheated component, required system reboot, etc.). Alternatively, the alert signal may be that which is optionally routed to a light-producing device, speaker, etc. of the system. If an alert is not requested in step 830, then steps 810 and 820 may be repeated. Alternatively, if an alert is requested in step 830, then step 840 may be performed.

Step 840 involves making a determination as to whether multiple fans are present to generate fan interference sounds. Multiple fans may be present within the same system, where the presence of the fans may be detected by accessing data stored within a system (e.g., in a coupled memory), performing inter-system communication (e.g., a fan presence check performed by a fan controller), etc. Alternatively, the presence of a fan outside a given system (e.g., not accessible by a given fan controller, used for HVAC, etc.) may be detected by varying the speed of a system fan over a given rotational speed range and simultaneously monitoring the frequency (e.g., using frequency detector 360) of any resulting fan interference sound. If a fan interference sound is detected, then the presence of at least one non-system fan may be identified. Accordingly, if an additional system or non-system fan enabling the generation of fan interference sounds is not detected in step 840, then steps 810 through 830 may be repeated. Alternatively, if an additional fan is detected such that fan interference sounds may be generated, then step 850 may be performed.

As shown in FIG. 8, step 850 involves performing frequency calibration. Frequency calibration may be used to determine a fan speed (e.g., of fan 220) required to produce a given frequency when the speed of a second fan (e.g., 230) is unknown. Alternatively, frequency calibration may be used to fine-tune a system for which fan speeds are known or reasonably approximated (e.g., where the fans are both controlled by the same fan controller). As such, a fan controller may vary the speed of a coupled fan until a desired frequency is produced, where the frequency is determined by one or more components (e.g., frequency detector 360) coupled to or integrated within the fan controller. Additionally, frequency calibration may be performed for multiple frequencies and fan speeds such that accuracy is improved.

Step 860 involves accessing alert information associated with an alert requested in step 830. The alert information (e.g., 340 of FIG. 3) may be accessed from a memory (e.g., 350 of FIG. 3) coupled to or integrated within a fan speed controller (e.g., 210, 610, 710, etc.). Additionally, the alert information may comprise information (e.g., data, instructions, etc.) relevant to the requested alert that may be used to implement an audible alert. For example, the alert information may comprise fan speed information required to implement a given siren, speech or other alert. Alternatively, the alert information may comprise frequency information that may be used to derive fan speed information for implementing the siren, speech or other alert.

Once the relevant alert information is accessed, the requested alert may be implemented in step 870 by varying the fan speed accordingly (e.g., in accordance with fan speed information associated with the alert information). A fan controller (e.g., 210, 610, 710, etc.) may vary the speed of the fan in accordance with the fan speed information (e.g., using fan speed feedback as discussed above with respect to FIG. 3), thereby varying the frequency and/or intensity of the fan interference sounds to implement the audible alert. Thereafter, steps 810 through 860 may be repeated to detect and correct for any undesirable change in temperature (e.g., resulting from implementing the alert, from a change in heat dissipation by one or more system components, etc.), and also to detect any requested alerts for which an audible alert may be implemented using fan interference sounds.

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A system comprising:
 a first fan;
 a fan controller coupled to said first fan and operable to control said first fan;
 a first interface coupled to said fan controller for receipt of alert signals; and
 wherein said fan controller is further operable to vary a speed differential between said first fan and a second fan, wherein said speed differential is operable to create an audible sound, and wherein a variation in said speed differential is used to change a frequency of said audible sound in response to a received alert signal.

2. The system of claim 1, wherein said speed differential is varied by changing a speed of said first fan.

3. The system of claim 1, wherein said fan controller is further operable to control said second fan, and wherein said speed differential is varied by said fan controller by changing a speed of said first fan and said second fan.

4. The system of claim 1 further comprising:
 a second interface coupled to said fan controller and for receiving temperature signals associated with a plurality of hardware components, wherein said plurality of hardware components are cooled by airflow from at least one of said first fan and said second fan, and wherein said fan controller is operable to change a speed of at least one of said first fan and said second fan in response to a received temperature signal.

5. The system of claim 1, wherein said audible sound comprises a beat pattern.

6. The system of claim 1, wherein said speed differential is varied to produce speech.

7. The system of claim 1, wherein said speed differential is varied to produce music.

8. The system of claim 1, wherein said speed differential is varied to produce an audible warning signal.

9. The system of claim 1, wherein said received alert signal also activates at least one of a light-producing device and a speaker.

10. The system of claim 1, wherein said fan controller comprises a programmable system on a chip (PSOC).

11. A fan controller comprising:
 a first interface for receiving an input signal;
 a processor coupled to said first interface and for generating an alert signal in response to a received input signal; and
 a fan speed control coupled to said processor and for varying a speed differential between a first fan and a second fan in response to a received alert signal, wherein said speed differential is operable to create an audible sound representing an alert, and wherein a variation in said speed differential is used to change a frequency of said audible sound in response to said received alert signal.

12. The fan controller of claim 11 further comprising:
 a memory coupled to said processor for storing alert information; and
 wherein said processor is operable to determine a portion of said alert information associated with said received input signal, and wherein said portion of alert information is used to generate said alert signal.

13. The fan controller of claim 11, wherein said speed differential is varied by changing a speed of said first fan.

14. The fan controller of claim 11, wherein said speed differential is varied by changing a speed of said first fan and said second fan.

15. The fan controller of claim 11 further comprising:
 a second interface coupled to said processor and for receiving temperature signals associated with a plurality of hardware components cooled by airflow from at least one of said first fan and said second fan, and wherein said fan controller is operable to change a speed of at least one of said first fan and said second fan in response to a received temperature signal.

16. The fan controller of claim 11, wherein said received input signal also activates at least one of a light-producing device and a speaker.

17. A method for enhanced alert notification, said method comprising:
 receiving an input signal;
 generating an alert signal in response to receipt of said input signal, wherein said alert signal is operable to control a speed differential between a first fan and a second fan, and wherein said speed differential is operable to create an audible sound; and
 varying said speed differential to change a frequency of said audible sound.

18. The method of claim 17 further comprising:
 determining a portion of alert information associated with said input signal, wherein said portion of alert information is used to generate said alert signal; and
 wherein said speed differential is varied by changing a speed of said first fan.

19. The method of claim 17, wherein said speed differential is varied by changing a speed of said first fan and said second fan.

20. The method of claim 17 further comprising:
 receiving a temperature signal associated with a plurality of hardware components, wherein said plurality of hardware components are cooled by airflow from at least one of said first fan and said second fan; and
 adjusting a speed of at least one of said first fan and said second fan in response to said temperature signal.

* * * * *